United States Patent
Guimbretiere

[11] Patent Number: 6,012,986
[45] Date of Patent: Jan. 11, 2000

[54] ROTATIONAL COUPLING OF A WHEEL FLANGE TO THE OUTPUT MEMBER OF A TRANSMISSION JOINT

[75] Inventor: Pierre Louis Guimbretiere, Neauphle Le Chateau, France

[73] Assignee: GKN Automotive AG, Lohmar, France

[21] Appl. No.: 08/805,770

[22] Filed: Feb. 25, 1997

[30] Foreign Application Priority Data

Feb. 27, 1996 [FR] France ................................ 96 02 414
Apr. 12, 1996 [FR] France ................................ 96 04 619

[51] Int. Cl.[7] ...................................................... F16C 1/26
[52] U.S. Cl. ........................ 464/178; 464/906; 384/544; 301/124.1
[58] Field of Search ..................................... 464/139, 906, 464/143, 178; 384/544, 542, 589; 301/124.1, 126, 131

[56] References Cited

U.S. PATENT DOCUMENTS

| | | | |
|---|---|---|---|
| 4,765,688 | 8/1988 | Hofmann | 464/906 |
| 4,786,115 | 11/1988 | Asberg | 301/124.1 |
| 4,835,829 | 6/1989 | Welschof et al. | 464/906 |
| 4,881,842 | 11/1989 | Farrell et al. | 464/178 |
| 4,957,328 | 9/1990 | Tsutsui | 301/124.1 |
| 5,209,701 | 5/1993 | Ishikawa et al. | 464/178 |
| 5,549,514 | 8/1996 | Welschof | 384/544 |

FOREIGN PATENT DOCUMENTS 2605557 4/1988 France .

*Primary Examiner*—Eileen Dunn Lillis
*Attorney, Agent, or Firm*—Howard & Howard

[57] ABSTRACT

A rotational coupling of a wheel flange (14) to an output member (12) of a transmission joint for use in coupling a motor vehicle wheel flange to the outward bell housing of a constant-velocity joint in the vehicle-transmission. The wheel flange (14) is mounted so that it can rotate freely through a wheel support (16) by a rolling-contact bearing (18). The wheel flange (14) and the joint output member (12) includes a complementary coupling (19) including a ring (40) attached to the end of the flange facing the output member (12). The ring includes driving profiles (44) designed to interact with complementary profiles (54) associated with the output member. The force-transmission interface of the driving profiles (44) is distributed essentially outwardly of the extension of the end of the wheel flange (14) bearing the ring (40).

23 Claims, 4 Drawing Sheets

ROTATIONAL COUPLING OF A WHEEL FLANGE TO THE OUTPUT MEMBER OF A TRANSMISSION JOINT

BACKGROUND OF THE INVENTION

The present invention relates to a coupling between a driving wheel flange and an output member of a transmission joint.

In a classic arrangement, the output member of a joint is formed by a bell housing of a constant-velocity joint extended from an integrally-formed splined wheel stub axle. To provide coupling, the stub axle is forcibly inserted into a broached bore in the flange and secured by a nut screwed onto a threaded end portion of the stub axle.

However, such an arrangement has a number of drawbacks. The stub axle must be of an extended length to pass through the wheel flange creating difficulty during transmission disassembly and increasing the weight of the rotating assembly supported by the rolling-contact bearing. Thus, it is often necessary to dismantle almost all of the vehicle power train in order to replace one of the constituent parts. Further, the forcible insertion of the stub axle into the broached bore in the wheel flange leads to swelling of the latter, which detrimentally effects the prior bearing adjustment and decreasing reliability.

In another known arrangement, the stub axle is dispensed with and the complementary coupling means include frontal splines at the end of the flange facing the bell housing of the constant-velocity joint. The splines interact with complementary frontal splines on the bell housing which is then secured by a screw which passes through the flange bore.

However, as the frontal splines are formed on a circle having a small radius, the contacting spline flanks must be inclined in order to avoid the splines being destroyed under the effect of torque. Thus, the flange is stressed in an undesirable axial manner during driving which tends to separate the flange from the constant-velocity joint.

Another solution has been proposed in document FR-A-2 605 557, especially in the embodiment described with reference to FIG. 4 which consists of a rotational coupling between a driving wheel flange and a transmission joint output member. The wheel flange rotates within a wheel support rolling-contact bearing having an inner race assembly integral with the wheel flange. The wheel flange and the output member of the joint are coupled through a ring attached to the end of the flange facing the output member and integral with the inner race assembly. The ring includes driving profiles designed to interact with complementary profiles integral with the output member distributed outwardly of the extension end of the wheel flange bearing the ring.

However, this solution also has drawbacks. In particular, the driving connection between the inner race of the bearing and the flange is achieved by complementary splines which are formed just at the end of the flange. Such an arrangement requires the flange to be extended substantially beyond the moving bodies of the bearing so as to allow the driving connection to be established. The result is that the center of the joint is an unacceptable distant from the bearing thereby increasing the overall size of the joint. In addition, the distance between the center of the joint and the bearing limits the turning angle of the vehicle on which the device is mounted.

SUMMARY OF THE INVENTION

The present invention provides a rotational coupling which does not have the drawbacks mentioned hereinabove and which provides the vehicle with a high turning angle in a compact size. Additionally, the coupling provides for quick disassembly and reliable high performance torque transmission.

The present invention provides a coupling wherein the driving connection between the inner race assembly of the bearing and the wheel flange extends at least partially into the region delimited axially between the outer ends of the rolling bodies of the bearing. The driving connection is achieved at least in part in the space delimited by the bearing. Thus the length of the end of the flange extending beyond the bearing can be reduced as it must no longer support the entire driving connection between the race assembly and the wheel flange. Preferably, the driving connection is formed by a weld or some other connection between the wheel flange and the race assembly.

In another embodiment, the race assembly is formed completely or partly integral with the flange. In this embodiment, the driving connection is established between the inner race and the flange directly in the material of which the flange is made. Importantly, in all embodiments, the field of stress passes through the bearing race assembly to cross the plane of the bearing in the direction of the wheel.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
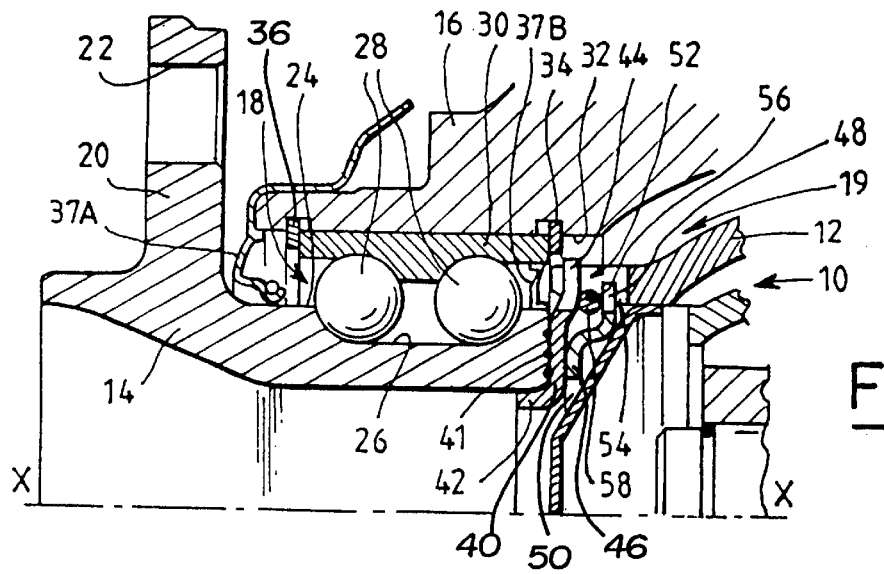
FIG. 1 is a longitudinal section of one end of a transmission associated with a driving wheel of a motor vehicle showing a coupling according to the present invention.

The arrangement represented in FIG. 1 essentially includes a constant-velocity joint 10 equipped with bell housing 12, a wheel flange 14, a wheel support 16, a ball bearing 18, and a coupling 19 between the flange 14 and the bell housing 12. This arrangement has overall symmetry of revolution of axis X—X.

The flange 14 has the overall shape of a sleeve with symmetry of revolution about the axis X—X. At its rear end, that is to say the end opposite the constant-velocity joint 10, an annular collar 20 is provided with tapped holes 22 for the accommodation of bolts or the like (not shown) for attachment of a wheel. The inner race of the bearing 18 is formed integrally with the wheel flange 14. The wheel flange 14 has a cylindrical external surface 24 and a peripheral groove 26 of oblong section with rounded edges forming raceways and thrust surfaces for balls 28 of the bearing arranged in two rows.

The bearing 18 includes an outer race 30 and a lining (not shown) for spacing the balls. The bearing 18 and flange 14 are accommodated in a through-bore 32 of the wheel support 16. The outer race 30 is held axially on either side by circlips 34, 36 accommodated in annular groove openings on the surface of the bore 32. Thus, the flange 14 is mounted so that it can rotate freely with respect to the wheel support 16. Additionally, seals 37A, 37B are provided on each side of the bearing 18 in order to protect it from debris and the like.

The coupling 19 includes a first toothed ring 40 welded to the front end of the flange 14 along a frontal weld 41. This first toothed ring 40 is formed of an annular metal sheet, the internal periphery of which is bent over to follow the internal profile of the flange forming a rim 42. On its outer periphery, the first tooth ring 40 includes first lateral teeth 44. The teeth have a diameter which is greater than that of the front end of the flange 14. The flanks of the first lateral teeth 44 extend substantially radially, that is to say in planes containing the axis X—X.

A second toothed ring 46 is welded coaxially to the first toothed ring 40. It includes external peripheral teeth 48 similar to the first lateral teeth 44. Its inner periphery 50 is welded to the ring 40 and is axially offset such that the concentric toothed rings 40, 46 defines an annular space 52 therebetween.

The coupling 19 includes frontal teeth 54 formed integrally with the bell housing 12. The frontal teeth 54 interact with the lateral teeth 44 and peripheral teeth 48 to provide a claw coupling. Hence, the flanks of the frontal teeth 54 extend substantially radially in planes containing the axis X—X. In addition, the inner ends of the frontal teeth 54 are chamfered, to aid the fitting of the flange 14.

On its inner cylindrical wall, the frontal teeth 54 include a peripheral groove 56. When the flange 14 and the bell housing 12 are coupled, a snap ring 58 is partially accommodated in the space 52 between the rings 40, 46 and the groove 56. The snap ring 58 has a thickness substantially equal to the width of the space 52 and provides axial retention between the flange 14 and the bell housing 12.

In order to fit the coupling 19, the seal 37A, the circlip 36, the two rows of balls 28, and the outer race 30 are arranged on the flange 14. The rings 40, 46 are welded coaxially to the frontal end of the flange 14, after the snap ring 58 is arranged between the two rings 40, 46 in the space 52. The assembly thus formed is arranged inside the wheel support 16 and the circlips 34, 36 retain the flange 14 against transnational movement with respect to the wheel support 16. The bell housing 12 of the constant-velocity joint is then brought axially against the flange 14. When the bell housing 12 is sufficiently engaged, the complementary teeth of the coupling 19 come into engagement and the snap ring 58, having retracted into the bottom of the space 52 under the action of the chamfered end of the peripheral teeth 48. The snap ring 58 is snapped into the groove 56 thus providing axial retention of the flange 14 and bell housing 12.

It is understood that with such an arrangement, the transmission of torque between the bell housing 12 and the flange 14 is by a claw coupling essentially tangentially with respect to the rotational movement of the flange. This transmission takes place in effect along the radial flanks of the complementary teeth. Under these conditions there is no axial force generated between the flange 14 and the bell housing 12 which means that the snap ring 58 is all that is needed to provide axial retention.

Moreover, as the torque-transmission inter-face is distributed essentially outside of the extension of the end of the flange 14, and especially facing the balls 28 of the bearing, the torque can be transmitted without risk to the teeth as they are distributed on a circle with a diameter greater than the end diameter of the flange 14. Thus, the radial teeth flanks are not damaged as the force applied to each tooth for a given torque is lower than the force which would have been applied if the torque were transmitted across a ring of smaller diameter placed in the extension of the end of flange. Furthermore, as the teeth are distributed on a circle having a diameter greater than the end of the flange, the angular play between the meshing teeth is smaller for the same manufacturing tolerance.

Figure 2:
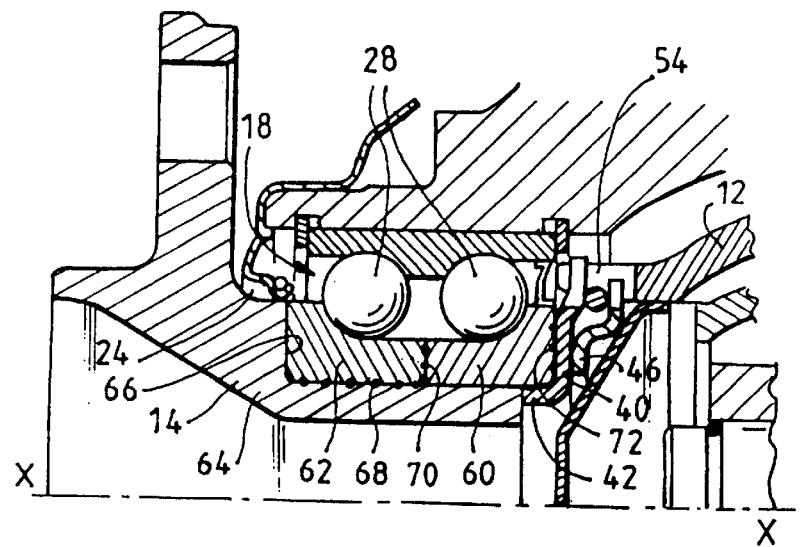
FIGS. 2 and 3 are alternative embodiments of the arrangement of FIG. 1, in which the raceways of the ball bearing are delimited by attached races.

Represented in FIG. 2 is an alternative embodiment of FIG. 1. In this embodiment, the inner race of the ball bearing 18 consists of two axially-touching races 60, 62. Each race bears a raceway for one of the rows of balls 28. The flange 14 has a peripheral cutout 64 on its external surface 24 for accommodating the races 60, 62.

In this embodiment, the rear race 62 is pushed over the flange 14 in the cutout 64 and bears against a surface 66. This race 62 is attached by a weld 68 along its cylindrical surface of contact with the flange 14, for example by laser welding. The front race 60 is pushed partially over the flange 14 and is welded to the rear race 62 along their contacting surfaces, giving rise to a weld 70. The first toothed ring 40 is welded to the frontal surface of the front race 60, along a weld 72 and in this embodiment, the rim 42 matches the shape of the projecting end of the race 60.

During driving, the torque from the bell housing 12 is communicated from the teeth 54 to the rings 40, 46. The teeth transmit the torque to the front race 60 which itself stresses the race 62 along the weld 70. The race 62 finally transmitting the torque to the flange 14 via the weld 64.

Figure 3:
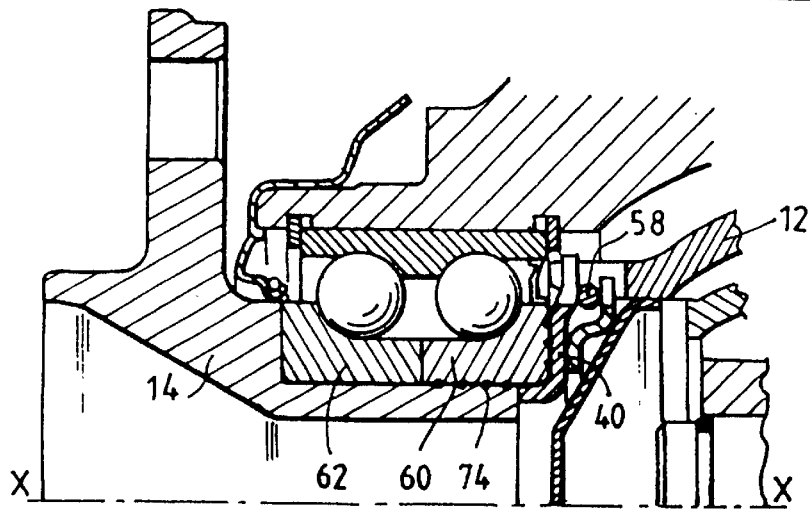

FIG. 3 represents another embodiment of the present invention. In FIG. 3, the rear race 62 is not welded to the flange 14. Only the front race 60 is welded along its cylindrical wall in contact with the flange along a weld 74. As above, the ring 40 is welded to the frontal surface of the front race 60. Alternatively, the race 62 may be formed integrally with the flange 14. The attached race 60 is then welded to the flange along its frontal surface with the race 62 formed along the cylindrical wall in contact with the flange 14.

Figure 4:
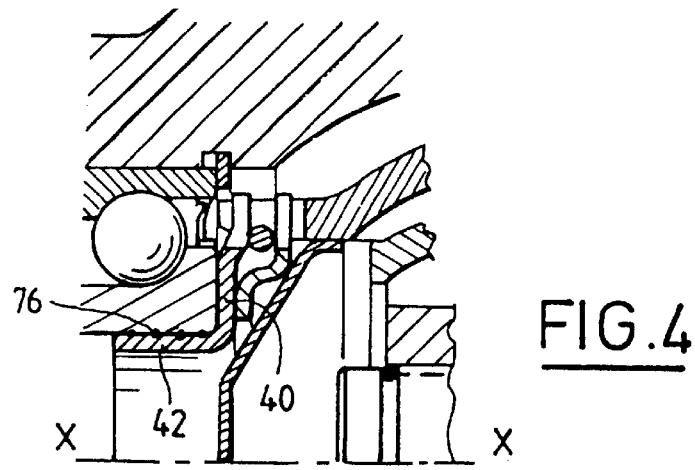
FIGS. 4, 5 and 6 are longitudinal sectional views of alternative forms of the embodiment of FIG. 1.

FIG. 4 differs from that of FIG. 1 in that the toothed ring 40 is not welded to the frontal end of the flange 14. In this case, the toothed ring 40 is welded to the flange along the rim 42, giving rise to a weld 76. To achieve this, the rim 42 engaging the axial passage of the flange 14 has a longer length than it had in the previous embodiments.

Figure 5:
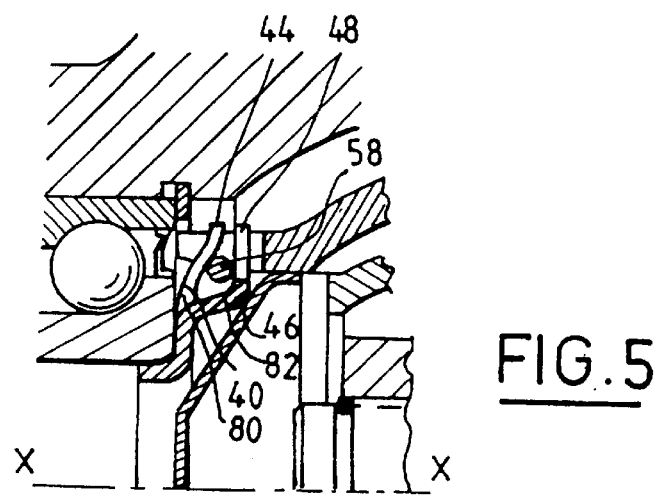

In FIG. 5, the toothed rings 40, 46 are formed by external radial tabs 80, 82 cut from the same annular metal sheet. The tabs 80, 82 are pushed and bent in planes extending substantially parallel to each other. Between them they delimit the space 52 for accommodating the snap ring 58. Moreover, the teeth 44 are inclined toward the teeth 56 in order to contain the space 52 at its outer end, thus trapping the snap ring 58 therebetween. The inclination of the teeth 44 is such that the snap ring 58 comes to bear against it and is thus centering with respect to the axis X—X.

Figure 6:
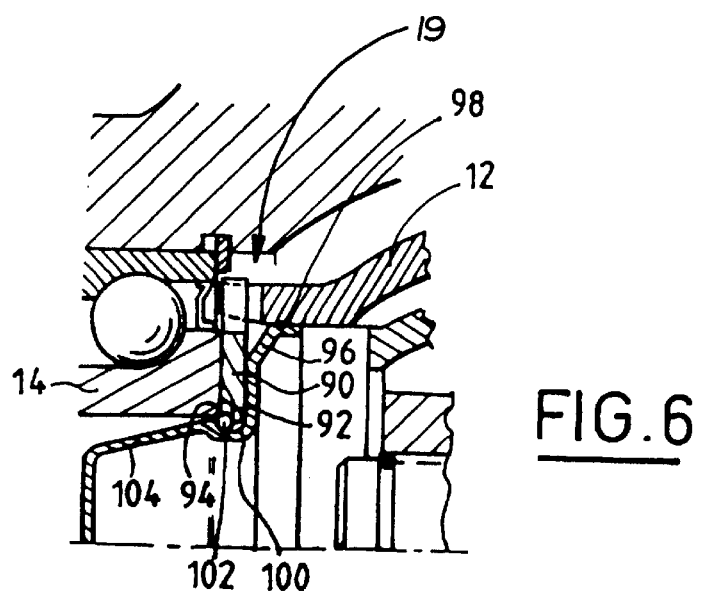

In FIG. 6, the coupling 19 is formed of a flat sheet welded to the frontal end of the flange 14. In this embodiment, the coupling 19 has a counterbore 92 at its internal periphery which delimits a groove 94 at the end face of the flange 14. A centering cup 96 is welded along annular weld 98 on the end of the bell housing 12. The centering cup 96 has a groove 100 formed by a fold in the sheet metal of which it is made. This groove 100 faces the groove 94. A snap ring 102 is accommodated at the interface between the concentric grooves 94, 100 in order to provide axial retention of the bell housing 12 with respect to the flange 14. The centering cup 96 includes behind the groove 100 a frustoconical portion 104, of which the diameter of the part bordering the groove 100 is substantially equal to the inside diameter of the flange 14. Thus, as the bell housing 12 is moved closer to the flange 14, this frustoconical portion 104 centers the bell housing 12 with respect to the flange. The frustoconical portion 104 pushes the snap ring 102 into the groove 94 as the coupling 19 is mounted. In this embodiment, the small diameter of the snap ring 102 provides the ability to withstand forces along the axis X—X, and provides additional axial retention between the flange 14 and the bell housing 12.

Figure 7:
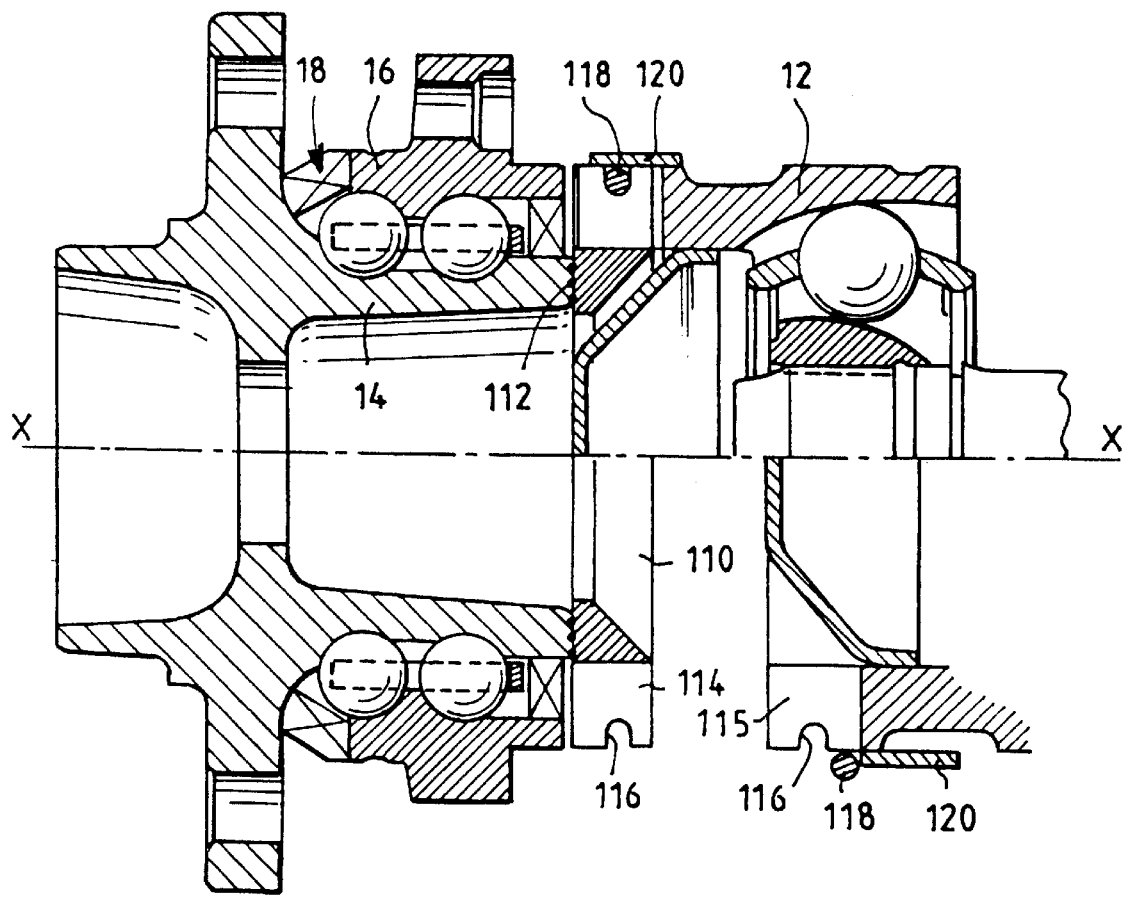
FIG. 7 is a longitudinal section of the end of a transmission associated with a driving wheel of a motor vehicle including a coupling according to the present invention, the transmission being represented coupled and uncoupled.

In the embodiment of FIG. 7, the outer race of the bearing 18 is formed integrally with the wheel support 16. The coupling 19 is represented in a coupled position in the part above the axis X—X and in an uncoupled position in the part illustrated below the axis X—X. A thick toothed ring 110 welded to the front end of the flange 14 along a frontal weld 112. As above, the ring 110 has external peripheral teeth 114, with an outside diameter which is greater than the diameter of the front end of the flange 14. The teeth 114 have a width (measured along the axis X—X) which is greater than the width of the ring 110 measured at its internal periphery. In this embodiment, the bell housing 12 has frontal teeth 115 designed to interact with the teeth 114. An external peripheral groove 116 is formed in the teeth 114 and in the teeth 115. This groove opens onto the external cylindrical surface of the teeth 114, 115. A snap ring 118 is accommodated inside the groove 116 in order to provide axial retention of the flange 14 and of the bell housing 12. A race 120 is pushed over the complementary teeth 114, 115 and covers the groove 116 in order to protect and hold the snap ring 118 accommodated therein. The race 120 is put in place by forced displacement in the direction of the axis X—X.

Figure 8:
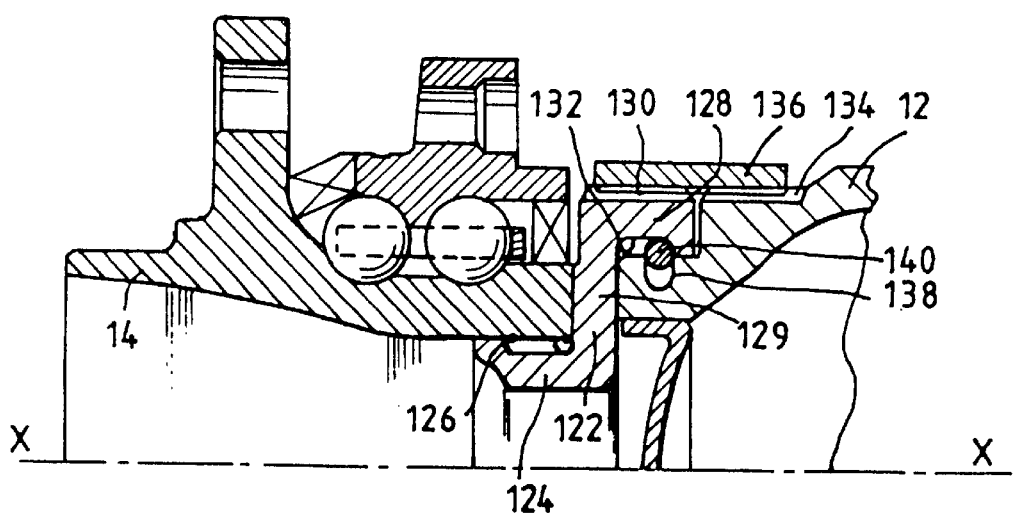
FIG. 8 is a longitudinal section of the end of a transmission associated with a driving wheel of a motor vehicle and including a coupling according to the present invention according.

In FIG. 8, the flange 14 is secured at its front end to a ring 122 having a substantially S-shape in radial section. A first inner leg delimits a rim 124 inserted into the central passage of the flange 14. The ring 122 is attached to the internal cylindrical surface of the flange 14 along a weld 126. The second leg of the S-shaped ring 122 defines a rim 128, the diameter of which is greater than the diameter of the end of the flange 14. The rims 124, 128 are connected by an annular web 129 extending radially at each end. The rim 128 has longitudinal splines 130 on its external cylindrical surface and a groove 132 formed on the internal surface of the rim 128.

The bell housing 12 has longitudinal splines 134, on its external cylindrical wall similar to the splines 130 on the ring 122. An internally splined sleeve 136 surrounds the splined segments 130, 134 which provides a rotational connection between the bell housing 12 and the flange 14 by the interaction of the splines of the sleeve 136 with the splined segments 130, 134. A groove 138 is formed in the bell housing 12 facing the groove 132. The snap ring 140 is arranged between these two concentric grooves to provide axial retention of the bell housing 12 and the flange 14. When mounted, the snap ring 140 retracts into the bottom of the groove 138 under the action of the front edge of the rim 128. It will be understood that the sleeve 136 allows the rotational coupling of the bell housing 12 to the flange 14 with force being transmitted essentially tangentially with respect to the direction of rotation of the flange 14.

Figure 9:
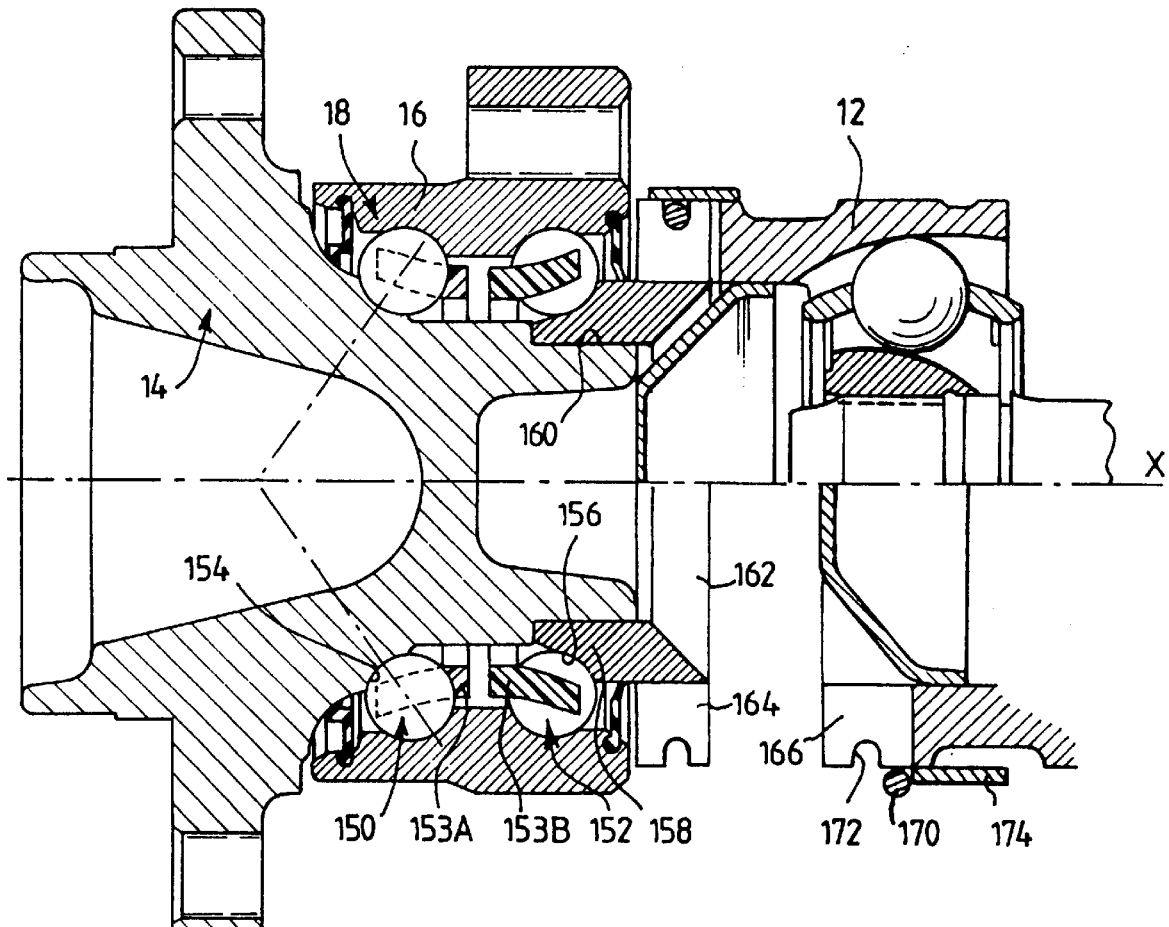
FIG. 9 is a longitudinal section of the end of a transmission associated with a driving wheel of a motor vehicle and including a coupling according to yet another embodiment of the present invention, the transmission being represented coupled and uncoupled.

FIG. 9 illustrates an alternative embodiment of the coupling of FIG. 7. The coupling is represented in the coupled position in the part above the axis and in the uncoupled position in the part below the axis. In this embodiment, the outer race of the bearing 18 is formed integrally with the wheel support 16. The bearing 18 includes two rows of balls 150, 152 which are separate and spaced apart by two independent cages 153A, 153B. A first raceway 154 for the row of balls 150 is located on the side intended to accept the wheel and is delimited directly on the external surface of the flange 14. A second raceway 156 for the second row of balls 152 is on an attached race 158 forming an inner race of the bearing. The attached race 158 is pushed over the external lateral wall of the flange 14 in a peripheral cutout 160 and welded to the flange 14. The coupling includes a toothed ring 162 similar to the toothed ring 110 of the embodiment of FIG. 7. In FIG. 9, the toothed ring 162 is formed integrally with the race 158. The race 158 thus forms a rim extending the ring 162 in the vicinity of the internal periphery. Therefore, the external driving profiles of the ring 162 are arranged essentially outside the extension of the race 158. These profiles include teeth 164 identical to the teeth 114. When the integrally-formed assembly of the race 158 and ring 162 are mounted at the end of the flange, the driving profiles are distributed essentially outside of the extension of the end of the wheel flange.

The bell housing 12 includes frontal teeth 166 which are identical to the teeth 115 and interact with the teeth 164 of the ring 162. Likewise, an axial-retention snap ring 170 is accommodated inside an external peripheral groove 172 formed both on the teeth 164 and on the teeth 168 and a race 174 covers the groove 172.

In order to mount the hub 14 in the wheel support 16, the balls of the first row 150 are mounted in the cage 153A. Next, the first row of balls 150 and cage 153A are arranged on the raceway 154 of the flange 14. The flange 14 is provided with the first row of balls 150 and is introduced into the wheel support 16 in the position represented in FIG. 9. The balls of the second row 152 are then mounted in the cage 153B. As the race 158 is not yet mounted, the balls of the second row 152 and the cage 153B are arranged in the raceway borne by the wheel support 16. When the entire row of balls 152 are correctly arranged, the assembly formed of the race 158 and of the ring 162 is put in place. The race 158 bearing the inner raceway 156 is brought into contact with the balls of the second row 152. Finally the race 158 is welded to the flange 14 in order to transmit torque.

When mounted, the balls of the first row 150 and the second row of balls 152 are each arranged in a single raceway. Thus the balls of the first row 150 are placed on the inner raceway 152 borne by the flange and the balls of the second row 152 are placed on the outer raceway borne by the wheel support 16. The complementary raceways are attached only after the balls have been arranged around the periphery and correctly spaced apart. The attached raceways therefore constitute no impediment to the placing of the balls. This method of assembly provides freedom of selection regarding the diameter and number of balls in the bearing 18.

In all the embodiments, the coupling allows quick and easy assembly and dismantling as it is not necessary to extract the wheel flange 14 from the wheel support 16, due to the short axial length of the coupling means. Likewise, the coupling can be mounted while the flange 14 is already in place in the wheel support 16.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the present invention includes all modifications encompassed within the spirit and scope of the appended claims and may be practiced otherwise than as specifically described.

I claim:

1. A rotational coupling of the flange (14) of a driving wheel to an output member (12) of a transmission joint, in which the wheel flange (14) is mounted to rotate freely through a wheel support (16) by means of a rolling-contact bearing (18), an inner race assembly (60, 62; 158) of which is made integral with the wheel flange (14) by a driving connection (68, 70; 74), the wheel flange (14) and the output member (12) of the Joint including complementary coupling means (19), which complementary coupling means (19) include a ring (40, 46; 90; 110; 122; 162) attached to the end of the flange facing the output member (12) and integral with said inner race assembly (60, 62; 158), said ring (40, 46; 90; 110; 122; 162) including driving profiles (44, 48; 114; 130; 164) designed to interact with complementary profiles (54; 115; 134, 136; 166) integral with said output member, the force-transmission interface of said driving profiles (44, 48; 114; 130; 164) being distributed essentially outwardly of the extension of the end of the wheel flange (14) bearing said ring (40, 46; 90; 110; 122; 162), wherein said driving connection (68, 70; 74) between the inner race assembly (60, 62; 158) of the bearing and the wheel flange (14) extends at least partially into the region delimited axially between the outer ends of the rolling bodies (28) of the bearing (18).

2. The coupling as claimed in claim 1, wherein said inner race assembly is formed integrally with the flange (14).

3. The coupling as claimed in claim 1, wherein said driving connection (68, 70; 74) is produced aligned with the rolling bodies (28).

4. The coupling as claimed in claim 1, wherein the transmission interface defines a plane generally facing the moving bodies of the bearing (18).

5. The coupling as claimed in claim 1, wherein the force-transmission interface between the driving profiles (44, 48; 114; 130) of the ring and the complementary driving profiles (54; 115; 134, 136) associated with the output member (12) is essentially radial, whereby the forces are transmitted essentially tangentially with respect to the movement of the wheel flange (14).

6. The coupling as claimed in claim 5, wherein the driving profiles of the ring include peripheral teeth (44, 48) and the output member (12) of the joint includes complementary peripheral teeth, the flanks of the teeth of the ring and output member extending substantially radially to provide a claw coupling.

7. The coupling as claimed in claim 6, wherein the teeth (44, 48) borne by said ring (40, 46) are lateral teeth, and the teeth (54) borne by the output member (12) of the joint is a frontal teeth.

8. The coupling as claimed in claim 7, wherein the coupling means (19) include an axial-retention member (58, 102, 118, 140) which interacts with said ring (40, 46) and with said output member (12) of the joint.

9. The coupling as claimed in claim 8, wherein said axial-retention member includes a snap ring (58) housed in a space (52) delimited by the toothed ring (40) and a complementary ring (46) having teeth secured to said toothed ring coaxially, a groove (56) for accommodating the snap ring being formed on the internal face of the toothing (54) borne by the output member (12) of the joint.

10. The coupling as claimed in claim 9, wherein the two rings (40, 46) are toothed and the toothing (44) of at least one ring (40) is inclined toward the teeth (48) of the other ring (46) in order to center and retain the snap ring (58).

11. The coupling as claimed in claim 8, wherein said axial-retention member includes a snap ring (118) accommodated in a groove (116) formed in the outer cylindrical surfaces of the complementary toothing (114, 115).

12. The coupling as claimed in claim 8, wherein said axial-retention member includes a snap ring (102) accommodated on the one hand in a first groove (94) delimited by the internal surface of the toothed ring (90) and on the other hand in a complementary concentric groove (100) arranged facing said first groove (94) and delimited on a centering cup (96) welded axially on the end of said output member (12).

13. The coupling as claimed claim 5, wherein the ring (122) includes longitudinal splines (130) on the external periphery of the ring, and the output member (12) includes similar splines (134), said coupling means furthermore including an internally splined sleeve (136) into which the splined portions (130, 134) of said ring (122) and of said output member (12) are pushed.

14. The coupling as claimed in claim 13, wherein an axial-retention snap ring (140) is accommodated on the one hand in a groove (132) formed in said ring (122) and on the other hand in a concentric groove (138) arranged opposite and formed in said output member (12) of the joint.

15. The coupling as claimed in claim 1, wherein the flange (14) externally has annular raceways (26) for the moving bodies (28) of said rolling-contact bearing (18) and said ring (40) is welded along the front end of said flange (14).

16. The coupling as claimed in claim 1, wherein the flange (14) is hollowed axially and externally has annular raceways (26) for the moving bodies (28) of said rolling-contact bearing (18), and wherein the ring (40) on the internal periphery has a re-entrant collar (42) along which the ring is welded to the flange (14) in the hollowed central part thereof.

17. The coupling as claimed in claim 1, wherein the rolling-contact bearing (18) includes an inner race (60, 62) secured to said flange (14) and said ring (40) is welded to the frontal face of the inner race (60) of the bearing.

18. The coupling as claimed in claim 17, wherein the inner race of the rolling-contact bearing includes two axially-touching races (60, 62) and the race (60) to which the ring (40) is welded is directly welded to the flange (14).

19. The coupling as claimed in claim 18, wherein the race (62) touching the race (60) to which the ring (40) is welded is formed integrally with the flange.

20. The coupling as claimed in claim 17, wherein the inner race of the rolling-contact bearing includes two axially-touching races (60, 62) and the race (60) to which the ring (40) is welded is welded to the complementary race (62) along their contacting surfaces, said complementary race (62) being welded to the flange (14).

21. The coupling as claimed in claim 1, wherein the rolling-contact bearing (18) has two rows (150, 152) of moving bodies and two inner raceways (154, 156) for these two rows of balls, and wherein at least one of the raceways (156) is delimited by a race (158) attached to the flange and forms an inner race of the bearing (18).

22. The coupling as claimed in claim 21, wherein said ring (164) including the driving profiles is formed integrally with said attached race (158).

23. The coupling as claimed in claim 21, wherein the other raceway (154) is delimited directly on the external surface of the flange (14).

* * * * *